US012712718B2

(12) United States Patent
Kumar et al.

(10) Patent No.: US 12,712,718 B2
(45) Date of Patent: Aug. 18, 2026

(54) SYSTEM AND METHOD FOR POINT-TO-POINT DECOY DIFFERENTIAL PHASE SHIFT (DPS) QUANTUM KEY DISTRIBUTION (QKD)

(71) Applicant: QuNu Labs Private Limited, Bengaluru (IN)

(72) Inventors: Krishnan Rajesh Kumar, Bengaluru (IN); Dilip Kumar Singh, Gurgaon (IN); Shashank Gupta, Fatehpur (IN); Vijayalaxmi Mogiligidda, Bangalore (IN); Sunil Kumar Gupta, Bangalore (IN)

(73) Assignee: QuNu Labs Private Limited, Bengaluru (IN)

( * ) Notice: Subject to any disclaimer, the term of this patent is extended or adjusted under 35 U.S.C. 154(b) by 35 days.

(21) Appl. No.: 19/027,015

(22) Filed: Jan. 17, 2025

(65) Prior Publication Data

US 2025/0240155 A1 Jul. 24, 2025

(30) Foreign Application Priority Data

Jan. 18, 2024 (IN) ............................ 202441003608

(51) Int. Cl.
*H04L 29/06* (2006.01)
*H04L 9/08* (2006.01)

(52) U.S. Cl.
CPC .......... *H04L 9/0852* (2013.01); *H04L 9/0819* (2013.01)

(58) Field of Classification Search
None
See application file for complete search history.

(56) References Cited

U.S. PATENT DOCUMENTS 8,311,224 B2 * 11/2012 Chen ...................... A63B 22/14 380/278
8,855,316 B2 * 10/2014 Wiseman ............. H04L 9/0855 380/278

(Continued)

FOREIGN PATENT DOCUMENTS

CA 111600706 A 8/2020

OTHER PUBLICATIONS

Banerjee, Supriyo et al. On Assisted Quantum Key Authentication Protocol. 2021 5th International Conference on Trends in Electronics and Informatics (ICOEI). https://ieeexplore.ieee.org/stamp/stamp.jsp?tp=&arnumber=9453009 (Year: 2021).*

(Continued)

*Primary Examiner* — Jeremiah L Avery
(74) *Attorney, Agent, or Firm* — Jason C. Cameron

(57) ABSTRACT

Embodiments of a present disclosure relate to communication systems and more particularly to a system and a method for a point-to-point decoy differential phase shift (DPS) Quantum Key Distribution (QKD). The system includes a source QKD device and a destination QKD device. The source QKD device generates and transmits one or more quantum states comprising a series of N coherent pulses with one or more phases to the destination QKD device. The destination QKD device receives, and records time information and corresponding detector units associated with each photon detection event in the received quantum states. The source and destination QKD devices use decoy states to detect and prevent attacks, such as Photon-Number-Splitting (PNS) attacks. The system allows for the secure generation of a secret key between the source and destination QKD devices.

18 Claims, 7 Drawing Sheets

(56) References Cited

U.S. PATENT DOCUMENTS

| | | | | |
|---|---|---|---|---|
| 9,819,418 | B2 * | 11/2017 | Nordholt | H04B 10/501 |
| 9,866,379 | B2 * | 1/2018 | Nordholt | H04B 10/70 |
| 11,695,550 | B2 * | 7/2023 | Yuan | H04L 9/0841<br>380/278 |
| 2006/0222180 | A1 * | 10/2006 | Elliott | H04L 9/0852<br>380/278 |
| 2007/0192598 | A1 * | 8/2007 | Troxel | H04L 9/0858<br>713/168 |
| 2011/0069972 | A1 * | 3/2011 | Wiseman | H04L 9/0852<br>398/186 |
| 2012/0177201 | A1 * | 7/2012 | Ayling | H04L 9/0858<br>380/278 |
| 2013/0101119 | A1 * | 4/2013 | Nordholt | H04L 9/0852<br>380/278 |
| 2013/0101121 | A1 * | 4/2013 | Nordholt | H04L 9/0852<br>380/279 |
| 2013/0251145 | A1 * | 9/2013 | Lowans | H04L 9/0891<br>380/44 |
| 2015/0222619 | A1 * | 8/2015 | Hughes | H04L 9/0852<br>713/168 |
| 2016/0218867 | A1 * | 7/2016 | Nordholt | H04L 9/0852 |
| 2019/0044713 | A1 * | 2/2019 | Tomita | H04B 10/70 |
| 2020/0028676 | A1 * | 1/2020 | Murakami | H04L 9/0852 |
| 2023/0275752 | A1 * | 8/2023 | Woodward | H04L 9/3242<br>713/168 |
| 2023/0393335 | A1 * | 12/2023 | Challener | H04L 9/0852 |
| 2024/0297784 | A1 * | 9/2024 | Mera | H04L 9/0858 |
| 2025/0007700 | A1 * | 1/2025 | Zhang | H04L 9/0852 |

OTHER PUBLICATIONS

Elwadeya, Mohamed Youssef Khalaf et al. Simplified Channel Authentication Algorithm for Secure Quantum Key Distribution. Simplified Channel Authentication Algorithm for Secure Quantum Key Distribution. https://ieeexplore.ieee.org/stamp/stamp.jsp?tp=&arnumber=7031664 (Year: 2014).*

Kiktenko, Evgeniy O. et al. Lightweight Authentication for Quantum Key Distribution. IEEE Transactions on Information Theory, vol. 66, Issue: 10. https://ieeexplore.ieee.org/stamp/stamp.jsp?tp=&arnumber=9076167 (Year: 2020).* https://www.researchgate.net/publication/322833285_Improved_security_bound_for_the_round-robin-differential-phase-shift_quantum_key_distribution; DOI: 10.1038/s41467-017-02211-x; LicenseCC BY 4.0, January 20189(1); Author: Zhen-Qiang Yin et al, 2018.

https://www.researchgate.net/publication/304505649_Two-dimensional_distributed-phase-reference_protocol_for_quantum_key_distribution; June 20166(1); DOI: 10.1038/srep36756; LicenseCC BY 4.0;Author: Davide Bacco et al, 2016.

https://arxiv.org/pdf/1910.07823; Jiu-Peng Chen, 1, 2 Chi Zhang, 1, 2 Yang Liu, 1, 2, 3 Cong Jiang, 4 Weijun Zhang, 5 Xiao-Long Hu,4 Jian-Yu Guan, 1, 2 Zong-Wen Yu,4, 6 Hai Xu,4 Jin Lin, 1, 2 Ming-Jun Li,7 Hao Chen,7 Hao Li,5 Lixing You,5 Zhen Wang, 5 Xiang-Bin Wang,2, 3, 4 Qiang Zhang, 1, 2 Jian-Wei Pan1, 2 1Shanghai Branch, National Laboratory for Physical Sciences at Microscale and Department of Modern Physics, 2019.

https://www.researchgate.net/publication/44852667_Decoy-state_quantum_key_distribution_with_polarized_photons_over_200_km, April 201018(8):8587-8594 DOI:10.1364/OE.18.008587 SourcePubMed; Decoy-state quantum key distribution with polarized photons over 200 km, 2010.

Long-Distance Decoy-State Quantum Key Distribution in Optical Fiber; https://www.researchgate.net/publication/6449621_Long-Distance_Decoy-State_Quantum_Key_Distribution_in_Optical_Fiber; Feb. 2007Physical Review Letters 98(1):010503 DOI: 10.1103/PhysRevLett.98.010503 SourcePubMed, 2007.

https://www.researchgate.net/publication/1737408_Practical_long-distance_quantum_key_distribution_system_using_decoy_levels; Practical long-distance quantum key distribution system using decoy levels IOP Publishing New Journal of Physics, 2009.

* cited by examiner

SYSTEM AND METHOD FOR POINT-TO-POINT DECOY DIFFERENTIAL PHASE SHIFT (DPS) QUANTUM KEY DISTRIBUTION (QKD)

EARLIEST PRIORITY DATE

This Application claims priority from a Complete patent application filed in India having Patent Application No. 202441003608, filed on Jan. 18, 2024, and titled "SYSTEM AND METHOD FOR POINT-TO-POINT DECOY DIFFERENTIAL PHASE SHIFT (DPS) QUANTUM KEY DISTRIBUTION (QKD)".

FIELD OF INVENTION

Embodiments of a present disclosure relate to quantum communication systems and more particularly to a system and a method for a point-to-point decoy Differential Phase Shift (DPS) Quantum Key Distribution (QKD) through a secure quantum communication channel.

BACKGROUND

Generally, Quantum Key Distribution (QKD) is a well-known technique which offers the possibility of secure key distribution. QKD relies on fundamental quantum properties and allows two parties, commonly referred to as Alice and Bob, to exchange a value and know that an eavesdropper, usually referred to as Eve, without the knowledge of the value. QKD allows key material to be securely derived by Alice and Bob as needed, which offers significant advantages over other methods of key distribution. QKD as described however requires an uninterrupted optical path from Alice to Bob to act as a quantum channel. This may be in free space or through an optical waveguide such as a fibre optic cable. In either case distances are limited, not least due to the use of single photons. Further in a network having a large number of connected users, it will be impractical for each user to have a direct optical link with each other user.

Currently, secure key distribution is crucial for information security. Current cryptographic systems based on public-key exchange can be compromised using Shor's algorithm and a large-scale quantum computer. Commercial QKD devices use weak coherent pulses to simulate single photons, but these contain multi-photon pulses that are vulnerable to Photon-Number-Splitting (PNS) attacks. The use of a low mean photon number of pulse results in poor quantum throughput and thus exceptionally low secret bit rates, as well as limits the possible transmission length due to dark counts in the detectors. Conventional commercial QKD based on Weak Coherent Signal (WCS) has secure key rate proportional to the square of the transmittance, and the commercial QKD is prone to the photon number splitting (PNS) attack and low throughput.

Conventionally, the system provides a bound-on information leakage for the round-robin-differential-phase-shift (RRDPS) quantum key distribution (QKD) protocol. Another conventional system provides a two-dimensional distributed-phase-reference (DPR) QKD protocol, which encodes information in the time and phase of weak coherent pulses, enabling a higher secret key rate in specific realistic network scenarios. Yet another conventional system provides a quantum key distribution method based on a quantum memory, which reduces the influence of dark counting and improves the safe code rate and transmission distance. However, the aforementioned conventional systems may not address the problems of operational distances, vulnerability against Photon Number Splitting Attack (PNS) attacks, and overall security and stability in commercial quantum QKD devices, which are currently limited by poor quantum throughput and low secret bit rates to enhance the security of quantum communication. Also, in the conventional systems, the distance up to which the achievable secure key rate is reduced (100 km). In addition, security of ideal single photon sources needs to encompass measures and properties that safeguard privacy of information encoded in single photons and prevent unauthorized access, interception, or tampering. The security of ideal single photon sources primarily relates to photon emission integrity, quantum key distribution (QKD) security, and the like.

Hence, there is a need in the art for an improved system and method for a point-to-point decoy Differential Phase Shift (DPS) Quantum Key Distribution (QKD) through a secure quantum communication channel, to address the at least aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

An aspect of the present disclosure provides a system for a point-to-point decoy Differential Phase Shift (DPS) Quantum Key Distribution (QKD). The system includes a source Quantum Key Distribution (QKD) device, which includes a state preparation unit. The state preparation unit generates one or more quantum states comprising a series of N coherent pulses with one or more phases of the one or more quantum states. The one or more quantum states comprises a signal state generated using a signal unit, and a decoy state generated using a decoy unit. Further, the state preparation unit attenuates, a transmission power of the signal state and the decoy state to control average number of photons for each of the series of N coherent pulses less than unity for a signal state and a decoy state. The N coherent pulses correspond to the highly attenuated pulses whose mean photon number (MPN) is less than unity. Further, the system includes a source post-processing unit. The source post-processing unit includes a source classical message transmitter unit. The source classical message transmitter unit transmits, through a pre-authenticated classical communication channel, timing information of the generated one or more quantum states comprising the signal state and the decoy state, to a destination Quantum Key Distribution (QKD) device. The attenuated N coherent pulses correspond to Weak Coherent Pulses (WCP).

Further, the system includes a source classical message receiver unit. The source classical message receiver unit receives, in response to the transmitted one or more quantum states, time information of the detection events, from the destination QKD device through a pre-authenticated classical communication channel. Furthermore, the system includes a source security analysis unit. The source security analysis unit analyzes a drop in yield for the signal state and the decoy state due to one or more factors, based on the received time information. Furthermore, the system includes a source measure and monitor unit. The source measure and monitor unit determine a Photon-Number-Splitting (PNS) attack on point-to-point decoy-based Quantum Key Distribution (QKD) in the signal state and the decoy state, and randomly disclosing complete detected decoy values and one or more detected signal pulses, based on analyzed drop in yield. The PNS attack is determined using a differential statistical analysis technique. Further, the source measure and monitor unit maps, in response to the determined PNS attack, a decoded bit value with an encoded value for a plurality of sifted qubits associated with the decoy state received from the destination QKD device, based on time stamps, to determine a number of the detected signal pulses.

Additionally, the system includes a source key generation unit and a source key management unit. The source key generation unit and a source key management unit perform at least one of a termination and a continuation of generating a secret key, based on a baseline decoy Quantum Bit Error Rate (QBER) and a baseline signal Quantum Bit Error Rate (QBER) and a photon dependent yield of the signal pulses and decoy pulses. Further, the destination QKD device includes a state detection unit. The state detection unit includes a demodulation unit. The demodulation unit receives, through the pre-authenticated classical communication channel, the one or more quantum states from the source QKD device. Further, the demodulation unit decodes quantum information in the received one or more quantum states. Furthermore, the destination QKD device includes a single photon detection unit. The single photon detection unit detects individual photons from the decoded quantum information in the received one or more quantum states. Furthermore, the destination QKD device includes a destination post-processing unit. The destination post-processing unit includes a destination classical message receiver unit. The destination classical message receiver unit receives, from the state detection unit, the decoded quantum information in the received one or more quantum states.

Further, the destination classical message receiver unit records, for each photon detection event of each of the plurality of photons in the received one or more quantum states, using the time stamps, time information and a corresponding single photon detection unit associated with each photon detection event. Further, the destination classical message receiver unit receives the estimated parameter value, and parity information during error correction. The destination post-processing unit includes a destination classical message transmitter unit. The destination classical message transmitter unit transmits the recorded time information to the source QKD device through the pre-authenticated classical communication channel. Further, the destination post-processing unit includes a destination security analysis unit. The destination security analysis unit sifts a plurality of qubits associated with the one or more quantum states, based on an instruction from the source QKD device 102 for determining the number of the detected signal pulses. Further, the destination classical message receiver unit receives, in response to sifting the plurality of qubits, the generated secret key from the source QKD device, based on the determined number of detections in the sifted qubits by the source QKD device, and the one or more factors.

Furthermore, the destination post-processing unit includes a destination measure and monitor unit. The destination measure and monitor unit determine the time information and a corresponding single photon detection unit associated with each photon detection event. Furthermore, the destination post-processing unit includes a destination key generation unit and a destination key management unit. The destination key generation unit and the destination key management unit performs at least one of a termination and a continuation of generating a secret key and assigning key-identity (key-ID), if the protocol is continued. Additionally, the destination post-processing unit includes a synchronization channel. The synchronization channel exchanges timing information of the source QKD device with the destination QKD device, and coordinates transmission and detection of the one or more quantum states, for synchronizing the clocks of the source QKD device with the destination QKD device to correlate the exchanged timing information.

Another aspect of the present disclosure provides a method for a point-to-point decoy Differential Phase Shift (DPS) Quantum Key Distribution (QKD). The method includes generating one or more quantum states comprising a series of N coherent pulses with one or more phases of the one or more quantum states. The one or more quantum states comprises a signal state generated using a signal unit and a decoy state generated using a decoy unit. Further, the method includes attenuating a transmission power of the signal state and the decoy state, to control average number of photons for each of the series of N coherent pulses less than unity for a signal state and a decoy state. The N coherent pulses correspond to the highly attenuated pulses whose mean photon number (MPN) is less than unity. For example, average number of photons are always less than 1 both for the signal and decoy pulse. For examples, for decoy pulses, average photon number is 0.2 and for signal it is around 0.7. Furthermore, the method includes transmitting, through a pre-authenticated classical communication channel, the timing information of generated one or more quantum states comprising the attenuated transmission power of the signal state and the decoy state, to a destination Quantum Key Distribution (QKD) device. The attenuated N coherent pulses correspond to Weak Coherent Pulses (WCP).

Additionally, the method includes receiving, in response to the transmitted one or more quantum states, time information, from the destination QKD device through a pre-authenticated classical communication channel. Further, the method includes analyzing, by the source QKD device, a drop in yield for the signal state and the decoy state due to one or more factors, based on the received time information. Furthermore, the method includes determining a Photon-Number-Splitting (PNS) attack on point-to-point decoy-based Quantum Key Distribution (QKD) in the signal state and the decoy state, and randomly disclosing complete detected decoy values and one or more detected signal pulses, based on analyzed drop in yield. The PNS attack is determined using a differential statistical analysis technique. For example, the PNS attack on the system is on both the signal pulses and decoy pulses. An Eve cannot distinguish which pulse is a signal pulse and which one is a decoy pulse. Additionally, the method includes mapping, in response to the determined PNS attack, a decoded bit value with an encoded value for a plurality of sifted qubits associated with the decoy state received from the destination QKD device, based on time stamps, to determine a number of detections in the plurality of sifted qubits. Further, the method includes performing at least one of a termination and a continuation of generating a secret key, based on a baseline decoy Quantum Bit Error Rate (QBER) and a baseline signal Quantum Bit Error Rate (QBER) and a photon dependent yield of the signal pulses and decoy pulses, and performing privacy amplification based on the upper bound of the single photon signal QBER to generate secure key and assign a key-id.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
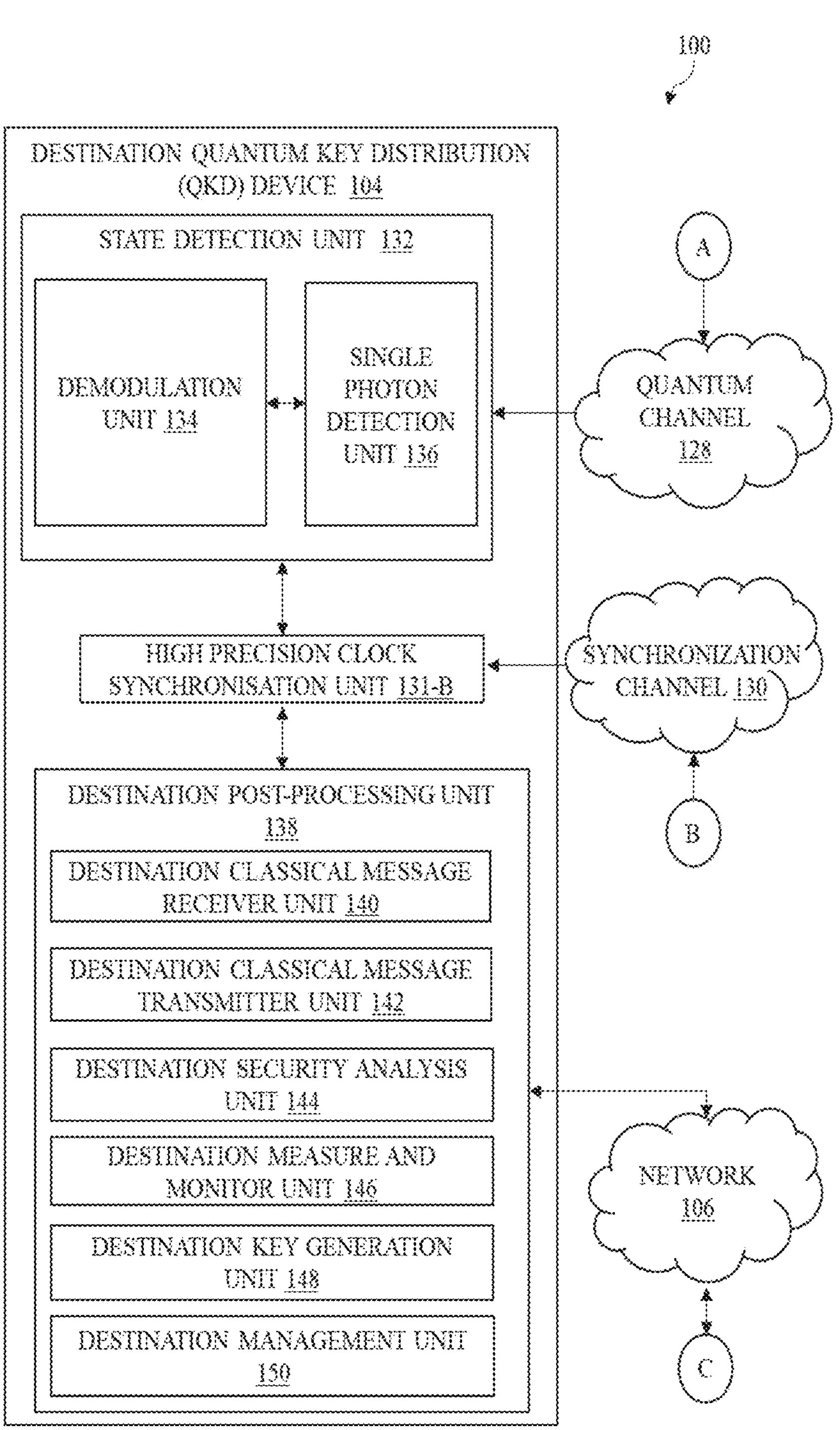
FIG. 1 illustrates an exemplary block diagram representation of a system for a point-to-point decoy Differential Phase Shift (DPS) Quantum Key Distribution (QKD), through a secure quantum communication channel, in accordance with an embodiment of the present disclosure.
Figure 1:
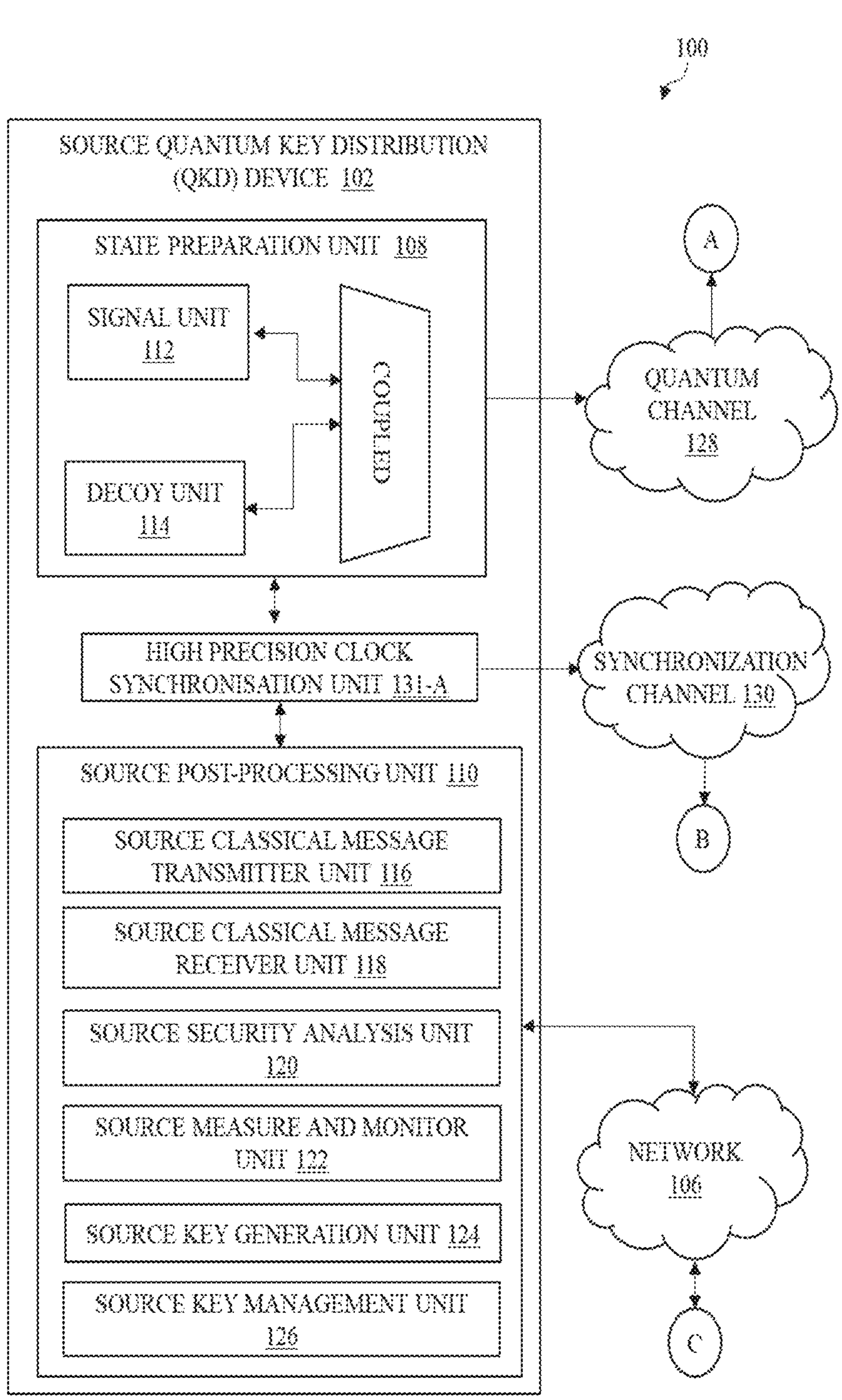

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" or a "subsystem" that is configured and operated to perform certain operations. In one embodiment, the "subsystem" may be implemented mechanically or electronically, so a module or a subsystem may comprise dedicated circuitry or logic that is permanently configured (within a special-purpose processor) to perform certain operations. In another embodiment, a "module" or a "subsystem" may also comprise programmable logic or circuitry (as encompassed within a general-purpose processor or other programmable processor) that is temporarily configured by software to perform certain operations.

Accordingly, the term a "module" or a "subsystem" should be understood to encompass a tangible entity, be that an entity that is physically constructed permanently configured (hardwired) or temporarily configured (programmed) to operate in a certain manner and/or to perform certain operations described herein.

Embodiments of the present disclosure provide a system and a method for a point-to-point decoy Differential Phase Shift (DPS) Quantum Key Distribution (QKD), through a secure quantum communication channel. The present disclosure provides a system and a method for detecting changes in photon-dependent yields (e.g., 5), thereby preventing eavesdropping attacks. This allows for a larger operational distance (e.g., 33 dB loss equivalent to e.g., 165 km for 0.2 dB/km fiber loss) compared to conventional Quantum Key Distribution (QKD) devices that utilize weak coherent pulses with low mean photon number. The larger operational distance (e.g., beyond 250 kms) may be achieved using a Superconducting Nanowire Single Photon Detectors (SNSPDs). Additionally, the present disclosure addresses a gap in the current state of the art by applying decoy methods. The present disclosure addresses the problem of limited operational distance, vulnerability against PNS attacks, and overall security in conventional QKD devices. By utilizing the decoy state method, the system and method of the present disclosure significantly improves key generation rates, distance, and security.

Further, the present disclosure uses decoy pulses for enabling higher mean photon numbers of the signal pulses (e.g., up to 1) to be used in commercial QKD devices, resulting in greater operational distances while maintaining security against Photon-Number-Splitting (PNS) attacks. The present disclosure uses a Decoy Differential Phase Shift (DDPS) scheme, where source QKD device (Alice) sends a weak coherent pulse train randomly including low-intensity decoy pulses in between signal pulses. The eavesdropping is revealed from photon number dependent yields and error rates associated with signal and decoy pulses.

Referring now to the drawings, and more particularly to FIGS. 1 through 4B, where similar reference characters denote corresponding features consistently throughout the figures, there are shown preferred embodiments and these embodiments are described in the context of the following exemplary system and/or method.

FIG. 1 illustrates an exemplary block diagram representation of a system 100 for a point-to-point decoy Differential Phase Shift (DPS) Quantum Key Distribution (QKD), through a secure quantum communication channel 128, in accordance with an embodiment of the present disclosure. The system 100 includes a source QKD device 102, and a destination QKD device 104, communicatively connected through a network 106. The network 106 may be a wired communication network and/or a wireless communication network. Further, the secure quantum communication channel 128 may be associated with the network 106. The secure quantum communication channel 128 may include at least one of, but not limited to, a quantum communication channel and/or a classical communication channel. Therefore, the source QKD device 102, and the destination QKD device 104 may be connected via two channels, one is a quantum communication channel and second one is a classical communication channel. In an embodiment, the source QKD device 102, and the destination QKD device 104 may enable a point-to-point quantum communication link. The source QKD device 102, and the destination QKD device 104 are the quantum key distribution systems. The Point-to-point quantum key distribution (QKD) is a cryptographic technique that uses the principles of quantum mechanics to exchange secret cryptographic keys between two parties, such as the source QKD device 102 and the destination QKD device 104, over a communication channel. The security of the key exchange is guaranteed by the laws of quantum mechanics, which state that any attempt to eavesdrop on the quantum channel 128 may be detected by the source QKD device 102 and the destination QKD device 104. The key generated through QKD can be used to encrypt and decrypt messages, providing a secure means of communication.

A classical network such as a classical network 106 of the system 100 may be any known network type, may be used for post-processing. The classical network may be comprised by an arrangement of free space transmitters and receivers forming a free space network. In an embodiment, the classical network may also comprise waveguide links between the nodes, for instance fibre optic. The classical network may be implemented purely for QKD purposes, i.e., the classical network may be a backbone carrying QKD signals only, to establish quantum keys between devices/nodes that can then be used to encrypt conventional communications between the devices/nodes sent via some other medium, for instance via another network-a wired electrical, wireless, or separate classical network for example.

The classical communication channel may be wired or wireless network, and the quantum communication channel 128 and the network 106 can be a fibre channel, a quantum channel in free space, and the like. The classic communication channel may be a direct point-to-point physical connection between two devices/nodes or can be a logic connection established by connecting the two devices/nodes to a classic network. The quantum communication channels are optical networks which may be any known type of optical network allowing exchange of suitable quantum signals.

In an embodiment, the system 100 may include the source Quantum Key Distribution (QKD) device 102. The source QKD device 102 includes a state preparation unit 108. In an embodiment, the state preparation unit 108 may be configured to generate one or more quantum states comprising a series of N coherent pulses with one or more phases of the one or more quantum states. The one or more quantum states comprises a signal state generated using a signal unit 112 and a decoy state generated using a decoy unit 114. In an embodiment, the signal state may be used for generating of secure symmetric keys, and the decoy state is used to detect eavesdropping. The one or more quantum states are generated using a chain of optical components (not shown in FIG. 1) comprising a laser, an inline polarizer, a True Random Number Generator (TRNG), an intensity modulator, a Delay Line Interferometer (DLI), and a phase modulator. The intensity modulator and the pulse modulator are used to randomly generate signal pulses of the signal state or decoy pulses of the decoy state. The TRNG is used to randomly select the signal pulses and the decoy pulses Further, the quantum state preparation unit 108 may be configured to attenuate, a transmission power of the signal state and the decoy state to control average number of photons for each of the series of N coherent pulses less than unity for a signal state and a decoy state. Average number of photons are always less than 1 both for the signal and decoy pulse. For examples, for decoy pulses, average photon number is 0.2 and for signal it is around 0.7. For both signal and decoy state, Mean Photon Number (MPN) is less than 1. The N coherent pulses correspond to the highly attenuated pulses whose mean photon number (MPN) is less than unity.

In an embodiment, the source QKD device 102 includes a source post-processing unit 110. The a source post-processing unit 110 may be configured to transmit, through a pre-authenticated classical communication channel, timing information of the generated one or more quantum states comprising the attenuated transmission power of the signal state and the decoy state, to a destination Quantum Key Distribution (QKD) device 104. The attenuated N coherent pulses correspond to Weak Coherent Pulses (WCP).

In an embodiment, the source QKD device 102 includes a source classical message receiver unit 118. The source classical message receiver unit 118 may be configured to receive, in response to the transmitted one or more quantum states, time stamps, time information, from the destination QKD device 104 through a pre-authenticated classical communication channel.

In an embodiment, the source QKD device 102 includes a source security analysis unit 120. The source security analysis unit 120 may be configured to analyze a drop in yield for the signal state and the decoy state due to one or more factors, based on the received time information. Further, the source QKD device 102 includes a source measure and monitor unit 122. The source measure and monitor unit 122 may be configured to determine a Photon-Number-Splitting (PNS) attack on point-to-point decoy-based Quantum Key Distribution (QKD) in the signal state and the decoy state, and randomly disclosing complete detected decoy values and one or more detected signal pulses, based on analyzed drop in yield. The PNS attack is determined using a differential statistical analysis technique. For example, the PNS attack on the system 100 is on both the signal pulses and decoy pulses. An Eve cannot distinguish which pulse is a signal pulse and which one is a decoy pulse. Furthermore, the source measure and monitor unit 122 may be configured to map, in response to the determined PNS attack, a decoded bit value with an encoded value for a plurality of sifted qubits associated with the decoy state received from the destination QKD device 104, based on time stamps, to determine a number of detections in the plurality of sifted qubits. For example, error estimation may be a part of the parameter estimation stage where, destination QKD device 104 may randomly disclose the 100% of the decoy detection value and 15% (configurable) of the signal detection values in response to a query from the source QKD device 102.

In an embodiment, the source QKD device 102 includes a source key generation unit 124, and a source key management unit 126. The source key generation unit 124, and a source key management unit 126 may be configured to perform at least one of a termination and a continuation of generating a secret key, based on a baseline decoy Quantum Bit Error Rate (QBER) and a baseline signal Quantum Bit Error Rate (QBER) and a photon dependent yield of the signal pulses and decoy pulses, and performing privacy amplification based on the upper bound of the single photon signal QBER to generate secure key and assign a key-id.

In an embodiment, the system 100 may include the destination QKD device 104. The destination QKD device 104 includes a state detection unit 132 and a demodulation unit 134. The state detection unit 132 and the demodulation unit 134 may be configured to receive, through the pre-authenticated classical communication channel 128, the one or more quantum states from the source QKD device 102. Further, the state detection unit 132 and the demodulation unit 134 may be configured to decode quantum information in the received one or more quantum states.

Further, the destination QKD device 104 may include a single photon detection unit 136. The single photon detection unit 136 may be configured to detect individual photons from the decoded quantum information in the received one or more quantum states. Further, the destination QKD device 104 may include a destination post-processing unit 138. The destination post-processing unit 138 may include a destination classical message receiver unit 140. The destination classical message receiver unit 140 may be configured to receive, from the state detection unit 132, the decoded quantum information in the received one or more quantum states.

Further, the destination classical message receiver unit 140 may be configured to record, for each photon detection event of each of the plurality of photons in the received one or more quantum states, using the time stamps, time information and a corresponding single photon detection unit 136 associated with each photon detection event.

In an embodiment, the destination QKD device 104 includes a destination classical message transmitter unit 142. The destination classical message transmitter unit 142 may be configured to transmit the recorded time information to the source QKD device 102 through the pre-authenticated classical communication channel.

In an embodiment, the destination QKD device 104 includes a destination security analysis unit 144. The destination security analysis unit 144 may be configured to sift a plurality of qubits associated with the one or more quantum states, based on an instruction from the source QKD device 102 for determining the number of the detected signal pulses.

In an embodiment, the destination QKD device 104 includes the destination classical message receiver unit 140. The destination classical message receiver unit 140 may be configured to receive, in response to sifting the plurality of qubits, the generated secret key from the source QKD device 102, based on the determined number of detections in the sifted qubits by the source QKD device 102, and the one or more factors. Further, receive, in response to post-processing and security analysis, the generated secret key from the source QKD device 102. The chronology is state preparation at the QKD transmitter unit, state/optical pulses propagation through the quantum channel, pulses detection at the SPDs in the QKD receiving unit, sifting of the pulses based on the detection time Stamps, photon dependent yield estimation for decoy and signal pulses at transmitter security analysis unit, continuation or termination. Parameter estimation, error correction, privacy amplification on the signal raw keys, secret key, key verification.

The drop in yield can be caused by numerous factors, including losses in the quantum channel (such as absorption, scattering, or reflection), errors in the measurement and detection process, or environmental noise (such as temperature fluctuations or electromagnetic interference). These factors can cause errors and decoherence in the quantum states, leading to a lower success rate in the key exchange process.

In an embodiment, the destination QKD device 104 includes a destination measure and monitor unit 146. The destination measure and monitor unit 146 may be configured to determine the time information and a corresponding single photon detection unit 136 associated with each photon detection event. Further, the destination QKD device 104 includes a destination key generation unit 148 and a destination key management unit 150. Further, the destination key generation unit 148 and a destination key management unit 150 may be configured to perform at least one of a termination and a continuation of generating a secret key and assigning key-identity (key-ID), if the protocol is continued, and performing privacy amplification based on the upper bound of the single photon signal QBER to generate secure key and assign a key-id.

Further, the system 100 may include a synchronization channel 130 connected to the source QKD device 102 through a high precision clock synchronization unit 131-A, and the destination QKD device 104 through a high precision clock synchronization unit 131-B. The synchronization channel 130 may be configured to exchange timing information of the source QKD device 102 with the destination QKD device 104, and coordinate transmission and detection of the one or more quantum states, for synchronizing the clocks of the source QKD device 102 with the destination QKD device 104 to correlate the exchanged timing information.

Figure 2A:
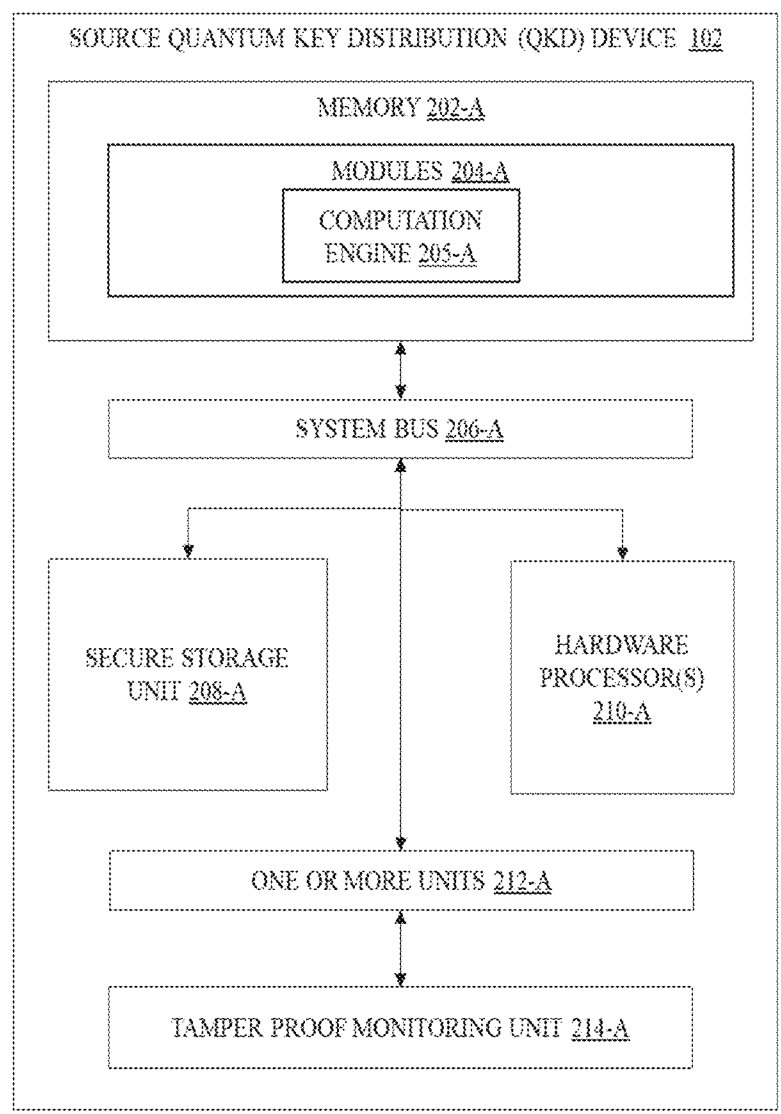
FIG. 2A illustrates an exemplary block diagram representation of a source Quantum Key Distribution (QKD) device as shown in FIG. 1, capable of a point-to-point decoy Differential Phase Shift (DPS) Quantum Key Distribution (QKD) through a secure quantum communication channel, in accordance with an embodiment of the present disclosure.
Figure 2B:
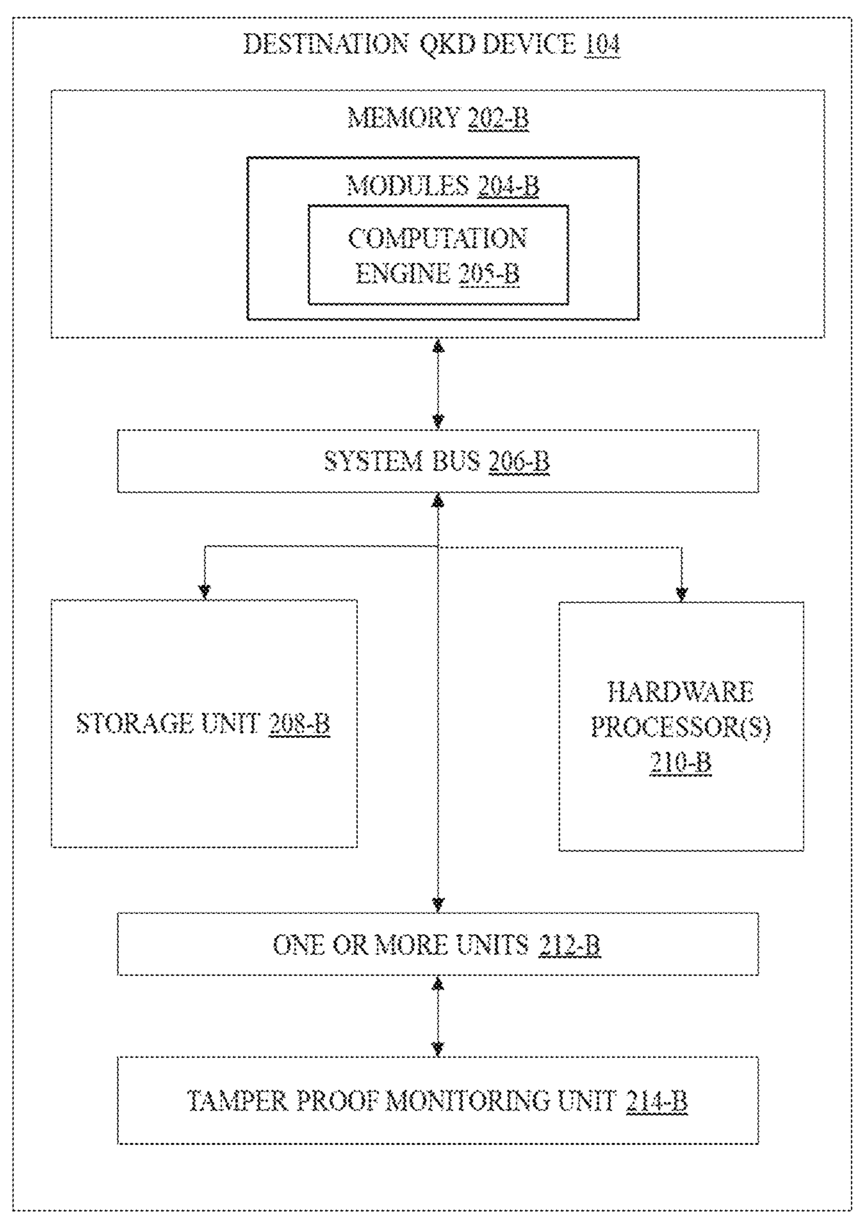
FIG. 2B illustrates an exemplary block diagram representation of a destination Quantum Key Distribution (QKD) device as shown in FIG. 1, capable of a point-to-point decoy Differential Phase Shift (DPS) Quantum Key Distribution (QKD) through a secure quantum communication channel, in accordance with an embodiment of the present disclosure.

The components of the source QKD device 102, and a destination QKD device 104 is described in more detail in FIGS. 2A and 2B, respectively.

Those of ordinary skilled in the art will appreciate that the hardware depicted in FIG. 1 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a quantum key distribution system as is unique to the present disclosure or necessary for an understanding of the present disclosure is depicted and described. The remainder of the construction and operation of the quantum key distribution system may conform to any of the various current implementation and practices known in the art.

FIG. 2A illustrates an exemplary block diagram representation of a source Quantum Key Distribution (QKD) device 102 as shown in FIG. 1, capable of a point-to-point decoy Differential Phase Shift (DPS) Quantum Key Distribution (QKD) through a secure quantum communication channel, in accordance with an embodiment of the present disclosure. The source Quantum Key Distribution (QKD) device 102 includes a memory 202-A, a system bus 206-A, a secure storage unit 208-A, a hardware processor(s) 210-A, one or more units 212-A, and tamper proof monitoring unit 214-A.

The source QKD device 102 may include a quantum source (not shown) emits pairs of photons in a desired entangled state. The memory 202-A and the hardware processor 210-A may be communicatively coupled by a system bus 206-A or a similar mechanism. The processor(s) 210-A, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 210-A may also include embedded controllers, such as generic or programmable logic devices or arrays, application specific integrated circuits, single-chip computers, and the like.

The memory 202-A may be non-transitory volatile memory and non-volatile memory. The memory 202-A may be coupled for communication with the hardware processor(s) 210-A, such as being a computer-readable storage medium. The hardware processor(s) 210-A may execute machine-readable instructions and/or source code stored in the memory 202-A. A variety of machine-readable instructions may be stored in and accessed from the memory 202-A. The memory 202-A may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202-A includes a plurality of subsystems stored in the form of machine-readable instructions on any of the above-mentioned storage media and may be in communication with and executed by the hardware processor(s) 210-A.

The memory 202-A includes a plurality of modules 204-A in the form of programmable instructions executable by the one or more hardware processors 210-A. The plurality of modules 204-A may also include a computation engine 205-A. The plurality of modules 204-A may be configured to execute the one or more units 212-A. The one or more units 212-A includes the state preparation unit 108, the source post-processing unit 110, and the high-precision clock synchronization unit 131-A.

In an embodiment, the state preparation unit 108 may be configured to generate one or more quantum states comprising a series of N coherent pulses with one or more phases of the one or more quantum states. The one or more quantum states comprises a signal state and a decoy state. The one or more phases comprises an initial phase of each of the one or more quantum states. The initial phase is a starting point or a reference point for the one or more phases of the N coherent pulses. The one or more phases comprises an encoded phase in which each of the series of N coherent pulses is encoded with a phase θn. The phase θn comprises at least one of a '0' value and a 'π' value. The at least one of a '0' value and a 'π' value of the phase θn is used to encode information to generate a shared secret key for a secure communication over the quantum communication channel. Further, the state preparation unit 108 may be configured to attenuate, a transmission power of the signal state and the decoy state to control average number of photons for each of the series of N coherent pulses less than unity for a signal state and a decoy state. The N coherent pulses correspond to the highly attenuated pulses whose mean photon number (MPN) is less than unity. Average number of photons are always less than 1 both for the signal and decoy pulse. For examples, for decoy pulses, average photon number is 0.2 and for signal it is around 0.7. For both signal and decoy state, Mean Photon Number (MPN) is less than 1. Attenuating the transmission power comprises a plurality of levels of attenuation of the N coherent pulses. The transmission power is attenuated to establish average number of photons for each of the N coherent pulses is less than unity for the signal state and the decoy state.

In an embodiment, the source QKD device 102 includes a source post-processing unit 110. The source post-processing unit 110 may include a source classical message transmitter unit 116. The source classical message transmitter unit 116 may be configured to transmit, through a pre-authenticate classical communication channel, the generated one or more quantum states comprising the attenuated transmission power of the signal state and the decoy state, to a destination Quantum Key Distribution (QKD) device 104. The attenuated N coherent pulses correspond to Weak Coherent Pulses (WCP).

In an embodiment, the source QKD device 102 includes a source classical message receiver unit 118. The source classical message receiver unit 118 may be configured to receive, in response to the transmitted one or more quantum states, time information, from the destination QKD device 104 through a pre-authenticated classical communication channel.

In an embodiment, the source QKD device 102 includes a source security analysis unit 120. The source security analysis unit 120 may be configured to analyze a drop in yield for the signal state and the decoy state due to one or more factors, based on the received time information. Further, the source measure and monitor unit 122 may be configured to determine a Photon-Number-Splitting (PNS) attack on point-to-point decoy-based Quantum Key Distribution (QKD) in the signal state and the decoy state, and randomly disclosing complete detected decoy values and one or more detected signal pulses, based on analyzed drop in yield. The PNS attack is determined using a differential statistical analysis technique. For example, the PNS attack on the system 100 is on both the signal pulses and decoy pulses. An Eve cannot distinguish which pulse is a signal pulse and which one is a decoy pulse. Furthermore, the source measure and monitor unit 122 may be configured to map, in response to the determined PNS attack, a decoded bit value with an encoded value for a plurality of sifted qubits associated with the decoy state received from the destination QKD device 104, based on time stamps, to determine a number of detections in the plurality of sifted qubits.

In an embodiment, the source QKD device 102 includes a source key generation unit 124 and the source key management unit 126. The source key generation unit 124 and the source key management unit 126 may be configured to perform at least one of a termination and a continuation of generating a secret key, based on a baseline decoy Quantum Bit Error Rate (QBER) and a baseline signal Quantum Bit Error Rate (QBER) and a photon dependent yield of the signal pulses and decoy pulses, and performing privacy amplification based on the upper bound of the single photon signal QBER to generate secure key and assign a key-id.

In an embodiment, the source security analysis unit 120 is further configured to determine the baseline decoy QBER and the baseline signal QBER and the photon dependent yield of the signal pulses and decoy pulses. The source security analysis unit 120 may be configured to calculate a signal gain of the signal state and a decoy gain of the decoy state from the time stamps of the sifted bits. Further, the source security analysis unit 120 may be configured to calculate a signal QBER of the signal state from the determined number of detections in a reconciled secret key and a number of sifted plurality of qubits associated with the signal state. Furthermore, the source security analysis unit 120 may be configured to calculate a decoy QBER of the decoy state from the determined number of detections in the sifted qubits associated with the decoy state.

Further, the source security analysis unit 120 may further be configured to estimate a number of photons specific yields and a QBER associated with the signal state and the decoy state. The source security analysis unit 120 may be configured to compare the estimated number of photons specific yields and the QBER between the signal state and the decoy state is within a predetermined tolerance value. Furthermore, the source security analysis unit 120 may be configured to perform continuation of generating the secret key, when the compared number of photons specific yields and the QBER between the signal state and the decoy state is within the predetermined tolerance value, and performing privacy amplification based on the upper bound of the single photon signal QBER to generate secure key and assign a key-id.

FIG. 2B illustrates an exemplary block diagram representation of a destination Quantum Key Distribution (QKD) device 204 as shown in FIG. 1, capable of a point-to-point decoy Differential Phase Shift (DPS) Quantum Key Distribution (QKD) through a secure quantum communication channel, in accordance with an embodiment of the present disclosure. The destination Quantum Key Distribution (QKD) device 104 includes a memory 202-B, a system bus 206-B, a secure storage unit 208-B, a hardware processor(s) 210-B, one or more units 212-B, and a tamper-proof monitoring unit 214-B.

In an exemplary embodiment, a phase state of photons is used to encode key bits.

The memory 202-B and the hardware processor 210-B may be communicatively coupled by a system bus 206-B or a similar mechanism. The processor(s) 210-B, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 210-B may also include embedded controllers, such as generic or programmable logic devices or arrays, application specific integrated circuits, single-chip computers, and the like.

The memory 202-B may be non-transitory volatile memory and non-volatile memory. The memory 202-B may be coupled for communication with the hardware processor(s) 210-B, such as being a computer-readable storage medium. The hardware processor(s) 210-B may execute machine-readable instructions and/or source code stored in the memory 202-B. A variety of machine-readable instructions may be stored in and accessed from the memory 202-B. The memory 202-B may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202-B includes a plurality of subsystems stored in the form of machine-readable instructions on any of the above-mentioned storage media and may be in communication with and executed by the hardware processor(s) 210-B.

The memory 202-B includes a plurality of modules 204-B in the form of programmable instructions executable by the one or more hardware processors 210-B. The plurality of modules 204-B may also include a computation engine 205-B. The plurality of modules 204-B may be configured to execute the one or more units 212-B. The one or more units 212-B includes the state detection unit 132, the destination post-processing unit 138, and the high precision clock synchronization unit 131-B.

In an embodiment, the destination QKD device 104 may include the state detection unit 132. The state detection unit 132 may include the demodulation unit 134. The demodulation unit 134 may receive, through the pre-authenticated classical communication channel, the one or more quantum states from the source QKD device 102. Further, the demodulation unit 134 may decode quantum information in the received one or more quantum states. Furthermore, the destination QKD device 104 may include a single photon detection unit 136. The single photon detection unit 136 may detect individual photons from the decoded quantum information in the received one or more quantum states. Further, the destination QKD device 104 may include the destination post-processing unit 138. The destination post-processing unit 138 includes a destination classical message receiver unit 140. The destination classical message receiver unit 140 may receive, from the state detection unit 132, the decoded quantum information in the received one or more quantum states The destination classical message receiver unit 140 may be configured to record, for each photon detection event of each of the plurality of photons in the received one or more quantum states, using the time stamps, time information and a corresponding single photon detection unit 136 associated with each photon detection event.

In an embodiment, the destination classical message transmitter unit 142 may be configured to transmit the recorded time information to the source QKD device 102 through the pre-authenticated classical communication channel.

In an embodiment, the destination security analysis unit 144 may be configured to sift a plurality of qubits associated with the one or more quantum states, based on an instruction from the source QKD device 102 for determining the number of the detected signal pulses.

In an embodiment, the destination classical message receiver unit 140 may be configured to receive, in response to sifting the plurality of qubits, the generated secret key from the source QKD device 102, based on the determined number of detections in the sifted qubits by the source QKD device 102, and the one or more factors. The drop in yield can be caused by numerous factors, including losses in the quantum channel (such as absorption, scattering, or reflection), errors in the measurement and detection process, or environmental noise (such as temperature fluctuations or electromagnetic interference). These factors can cause errors and decoherence in the quantum states, leading to a lower success rate in the key exchange process.

In an embodiment, the destination measure and monitor unit 146 may be configured to determine the time information and a corresponding single photon detection unit 136 associated with each photon detection event. Further, the destination key generation unit 148 and the destination key management unit 150 may be configured to perform at least one of a termination and a continuation of generating a secret key, and assigning key-identity (key-ID), if the protocol is continued, and performing privacy amplification based on the upper bound of the single photon signal QBER to generate secure key and assign a key-ID.

In an embodiment, the synchronization channel 130 may be configured to exchange timing information of the source QKD device 102 with the destination QKD device 104, and coordinate transmission and detection of the one or more quantum states, for synchronizing the clocks of the source QKD device 102 with the destination QKD device 104 to correlate the exchanged timing information.

In an embodiment, the state detection unit 132 may further be configured to map each photon detection event to a corresponding pulse in the generated series of N coherent pulses. Further, the one or more detector units 118 is configured to reconstruct the generated one or more quantum states, based on mapping each photon detection event to the corresponding pulse.

Figure 3:
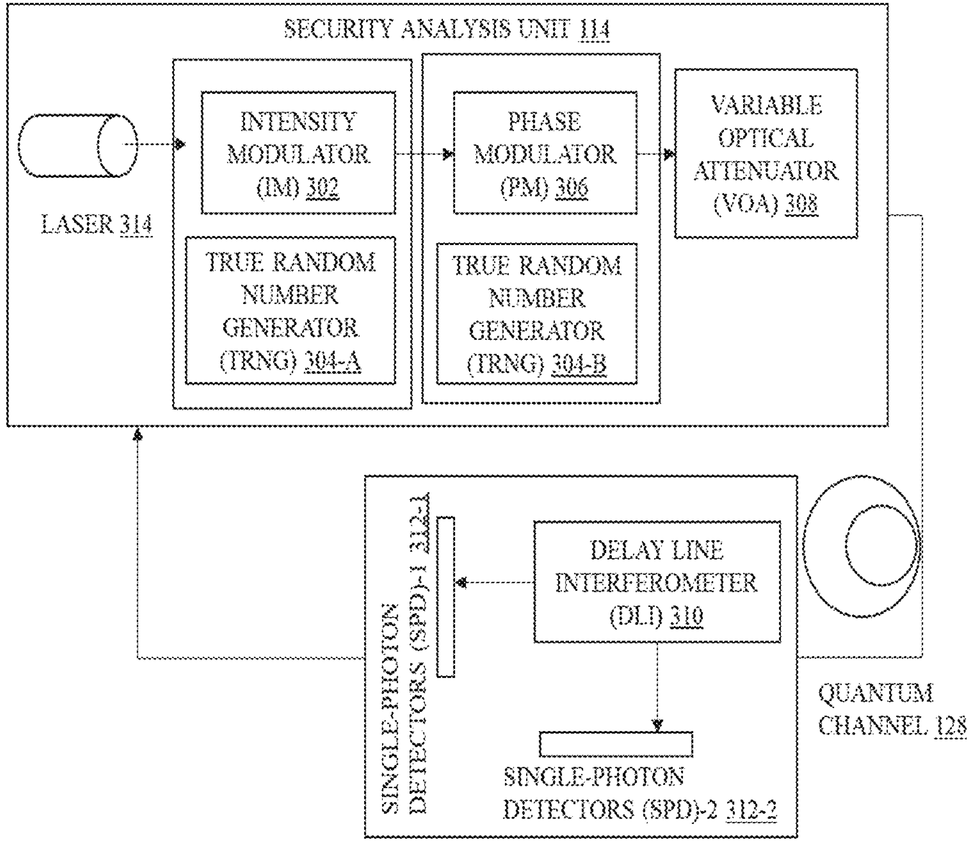
FIG. 3 illustrates an exemplary block diagram representation of a decoy unit associated with the source Quantum Key Distribution (QKD) device, in accordance with an embodiment of the present disclosure.

FIG. 3 illustrates an exemplary block diagram representation of the decoy unit 114 associated with the source Quantum Key Distribution (QKD) device 102, in accordance with an embodiment of the present disclosure. The decoy unit 114 includes a plurality of Decoy state protocol blocks in quantum key distribution (QKD) using an intensity modulation (IM) 302, a true random number generator (TRNG) 304A and 304-B, a phase modulation (PM) 306, a variable optical attenuator (VOA) 308, a Delay Line Interferometer (DLI) 310, a Single-Photon Detectors (SPD) 312-1 and 312-2 can enhance the security of the QKD system 100, and a laser source 314.

For example, the source QKD device 102 may uses the IM 302 to randomly generate signal and decoy pulses, which are then subjected to attenuation by the VOA 308. The IM 302 and the TRNG 304 are used together to generate random phase values that are applied to the signal and decoy pulses by the PM 306. The signal and decoy pulses are then combined using the DLI 310, which creates interference between the two consecutive pulses. The DLI 310 shifts the pulse train by one pulse in its longer path. The normal pulse train and the shifted pulse train self-interfere at either of the two channels of the DLI 310 depending upon the phase difference. Two consecutive pulses could be both signal and/or decoy pulses.

The resulting interference pattern is detected by SPDs 312-1, and 312-2. The destination QKD device 104 uses the measurement results to extract the secret key.

By using decoy states with different mean photon numbers, the destination QKD device 104 can detect if an eavesdropper is present and attempting to intercept the transmission. The use of DPS blocks with IM, TRNG, PM, VOA, DLI, and SPD can significantly improve the security of the QKD system and make it more resistant to attacks by eavesdroppers. In the decoy state protocol blocks in quantum key distribution (QKD), several components are commonly used to prepare and manipulate the quantum states, as well as to measure them. These components can include the Intensity Modulator (IM) 302, where the source QKD device 102 uses the IM 302 to modulate the intensity of the laser pulses, allowing the source QKD device 102 to randomly generate signal and decoy pulses. The True Random Number Generator (TRNG) 304 is used to generate a random sequence of numbers, which is used to control the intensity of the pulses generated by the IM 302. Further, the Phase Modulator (PM) 306 is used to modulate the phase of the laser pulses, allowing the source QKD device 102 to encode the secret key bits into the quantum states. The source QKD device 102 uses the Variable Optical Attenuator (VOA) 302 to attenuate the transmission power of the laser pulses, creating the decoy states with different mean photon numbers. Further, the Delay Line Interferometer (DLI) 310 is used to separate the signal and decoy states and to align them in time. Additionally, the Single-Photon Detector (SPD) 312 is used by the destination QKD device 104 to measure the quantum states sent by the source QKD device 102 and to detect any potential eavesdropping.

Exemplary Scenario

Decoy state enabled QKD systems such as the system 100 may utilize a conventional signal state, in addition to dedicated security states, including decoy and vacuum states. The signal states are used to transmit the quantum pulses (qubits) required for generating the shared secret key. The decoy states are used to increase the probability of detecting photon number splitting (PNS) attack, on the quantum channel through statistical differentiation with the signal state. Further, the vacuum states are used to determine the detector's dark count rate in absence of photons. Decoy pulses also improve the accuracy of parameters required to determine the secure key rate, including estimating a tight lower bound on the signal clicks corresponding to the single photon state and determining a tight upper bound on the signal QBER corresponding to the single photon pulses. In this protocol, Alice randomly selects the type of state based on predetermined occurrence percentages of signal and decoy pulses.

This protocol leads to higher key distribution rates and greater operational distances by increasing a Mean Photon Number (MPN) of the signal state (e.g., an MPN of 0.7, which is greater than the traditionally used 0.1). Additionally, utilizing different MPNs for the signal and decoy states allows the QKD system 100 to detect photon number splitting (PNS) attack, using the decoy state protocol security condition. The selection of the MPN in the system 100 indeed influenced by several factors, including the losses in the optical channel and assumptions regarding the eavesdropper's technology. The MPN determines the minimum number of photons required for the receiver to detect the signal and generate a secure key. In general, the MPN is set higher when the losses in the optical channel are higher, as this reduces the likelihood of an eavesdropper intercepting the signal. This is because losses in the optical channel can reduce the signal-to-noise ratio (SNR), making it easier for an eavesdropper to intercept the signal without being detected. Consider a scenario of point-to-point Quantum Key Distribution (QKD) through a secure quantum communication channel as in in below steps.

Step 1: state preparation by the source QKD device 102: the source QKD device 102 generates a train of N coherent pulses with 'θ' as the initial phase and 'θn' as encoded phase which takes {0, π} values. The source QKD device 102 heavily attenuates the transmission power such that mean photon number per pulse is less than unity for both the signal state and the decoy state (μs>μd). This is performed using a chain of optical components (such as the laser 314, the inline polariser, the True Random Number Generator (TRNG) 304, intensity modulator 302, phase modulator 306 shown in FIG. 3). Using the intensity modulator 302, and a pulse generation logic, the source QKD device 102 randomly generates signal or decoy pulses.

Step 2: transmission and detection by the destination QKD device 104: the generated state information encoded in photons travels through the quantum channel 128 (165 km length larger operational distance (e.g., beyond 250 kms)). The destination QKD device 104 tags each click and the corresponding detector. The destination QKD device 104 shares the time information with the source QKD device 102 over prior authenticated classical communication channel.

Step 3: sifting by the source QKD device 102 and the destination QKD device 104: the destination QKD device 104 announces the time stamp data corresponding to each detection event. The source QKD device 102 asks for the bit value corresponding to e.g., 100% decoy pulses and 15% signal pulses randomly as a part of the bit error estimation step. The source QKD device 102 and the destination QKD device 104 performs sifting on both the signal and decoy state qubits.

Step 4: decoy usage by the source QKD device 102: the source QKD device 102 uses the counting rate data of the pulses to determine the drop in yield both for the signal and decoy statistics. A Photon Number Splitting (PNS) attack is a technique in quantum cryptography where an eavesdropper intercepts single photons from weak quantum signals, allowing them to gain information about the quantum key without introducing detectable interference. This undermines the security of quantum key distribution protocols. Hence, drop in signal state would not be significant in the event of a photon-number-splitting (PNS) attack. However, the MPN of decoy pulses is close to 0.1 that contains mainly the single photons and hence a significant drop in the yield is observed in the event of the PNS attack. The signal state (μ) facilitates higher key distribution rates and greater operational distances through an increased MPN, while the decoy state (v) is used to increase the likelihood of detecting an attack using differential statistical analysis. For example, the PNS attack on the system 100 is on both the signal pulses and decoy pulses. An Eve cannot distinguish which pulse is a signal pulse and which one is a decoy pulse.

Step 5: terminate/continue secret key generation by the source QKD device 102: for the sifted decoy state qubits, the source QKD device 102 checks the decoded bit value by the destination QKD device 104 with the encoded value and records the number of errors. At this point, the source QKD device 102 can abort/terminate/continue the secret key generation depending upon the baseline decoy and signal QBER (Ev) and photon dependent yield of the signal pulses and decoy pulses.

Step 6: error reconciliation by the source QKD device 102 and the destination QKD device 104: the source QKD device 102 and the destination QKD device 104 perform cascaded bi-directional error correction algorithms as in the case of DPS protocol. The destination QKD device 104 can reveal the detected signal pulses to the source QKD device 102 because these are only for security check and not for key generation. Even if attackers (such as Eve) listen to decoy information, the attacker may not generate the secret key using the decoy qubit value.

Step 7: gains, QBERs, and dark counts calculation: the signal and decoy gains are calculated from the measured number of sifted qubits and number of pulses sent. The signal QBER is calculated from the measured number of errors in the reconciled key and the number of sifted signal states, while the decoy state QBER is calculated from the measured number of errors in the sifted decoy state qubits. Separately, the number of detections measured by Bob when Alice sends no pulses (vacuum states) is used to determine the system's dark count probability.

Step 8: a second security check by the source QKD device 102 and the destination QKD device 104: a comparison of signal and decoy state estimated photon number specific yields Y. Once the source QKD device 102 and the destination QKD device 104 have performed the second security check and determined that the estimated photon number specific yields and QBERs are within the predetermined tolerance, they proceed with key generation.

Privacy amplification: the source QKD device 102 and the destination QKD device 104 perform privacy amplification using a universal hash function to distil a secure final key from their sifted error corrected bits. The final key length is shorter than the sifted key length to ensure information-theoretic security.

Key distribution: the source QKD device 102 and the destination QKD device 104 now share a secret key that can be used for secure communication using symmetric encryption algorithms. They can use this key to encrypt messages and send them over a classical data channel.

Authentication: To ensure that the received message is not tampered with, the source QKD device 102 and the destination QKD device 104 can use message authentication codes (MACs) that are computed using the secret key they share. This allows them to verify the integrity of the message and ensure that it has not been modified by an attacker.

Figure 4A:
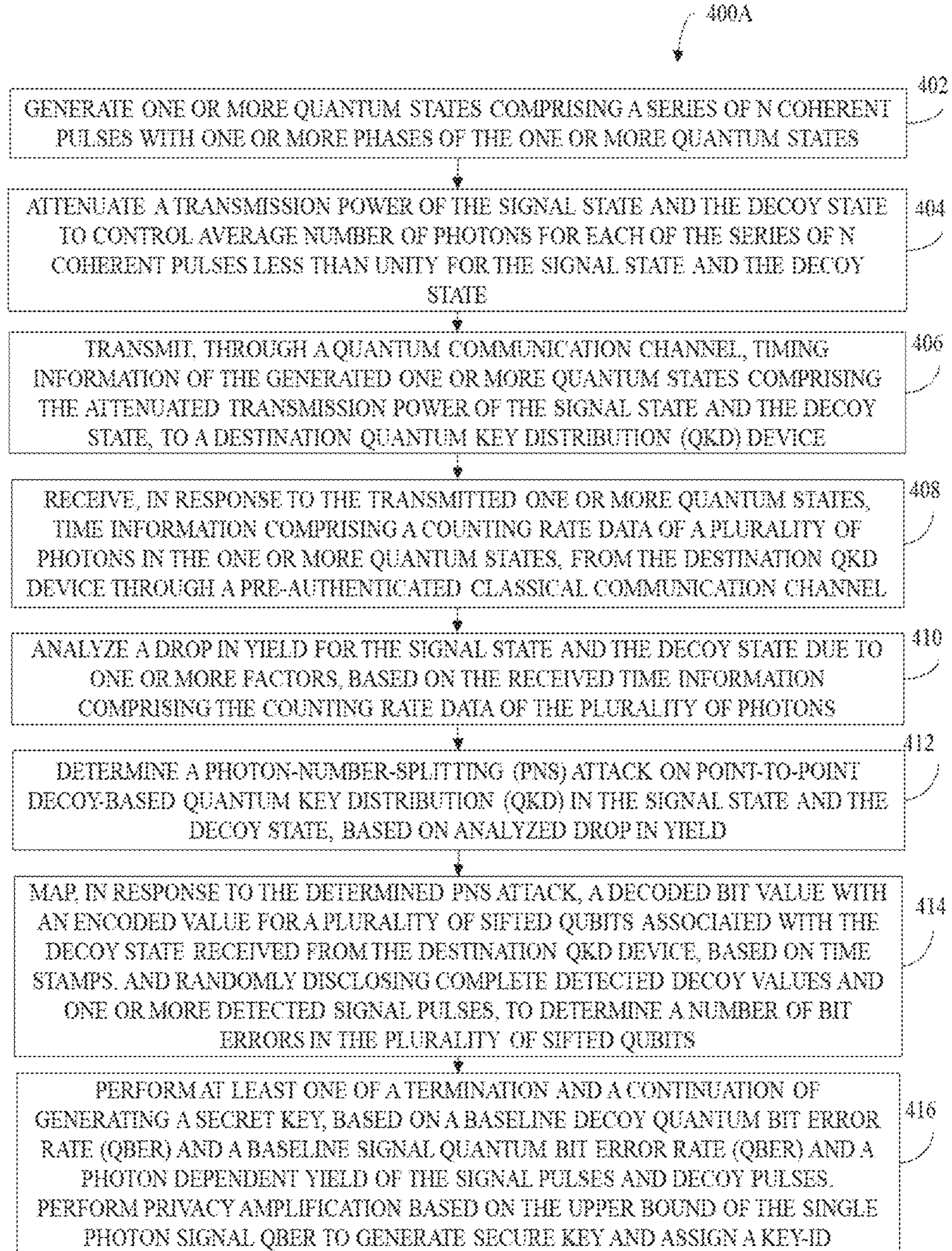
FIG. 4A is an exemplary flow diagram representation of a method for a point-to-point decoy Differential Phase Shift (DPS) Quantum Key Distribution (QKD) using a source Quantum Key Distribution (QKD) device, through a secure quantum communication channel, in accordance with an embodiment of the present disclosure.

FIG. 4A is an exemplary flow diagram representation of a method 400A for a point-to-point decoy Differential Phase Shift (DPS) Quantum Key Distribution (QKD), using the source Quantum Key Distribution (QKD) device 102, through a secure quantum communication channel, in accordance with an embodiment of the present disclosure.

At block 402, the method 400A includes generating, by a source Quantum Key Distribution (QKD) device 102 associated with a system 100, one or more quantum states comprising a series of N coherent pulses with one or more phases of the one or more quantum states. The one or more quantum states comprises a signal state generated using a signal unit 112 and a decoy state generated using a decoy unit 114.

At block 404, the method 400A includes attenuating, by the source QKD device 102, a transmission power of the signal state and the decoy state to control average number of photons for each of the series of N coherent pulses less than unity for a signal state and a decoy state. The N coherent pulses correspond to the highly attenuated pulses whose mean photon number (MPN) is less than unity.

At block 406, the method 400A includes transmitting, by the source QKD device 102, through a pre-authenticated classical communication channel, timing information of the generated one or more quantum states comprising the attenuated transmission power of the signal state and the decoy state, to a destination Quantum Key Distribution (QKD) device. The attenuated N coherent pulses correspond to Weak Coherent Pulses (WCP).

At block 408, the method 400A includes receiving, by the source QKD device 102, in response to the transmitted one or more quantum states, time information, from the destination QKD device through a pre-authenticated classical communication channel.

At block 410, the method 400A includes analyzing, by the source QKD device 102, a drop in yield for the signal state and the decoy state due to one or more factors, based on the received time information comprising the counting rate data of the plurality of photons.

At block 412, the method 400A includes determining, by the source QKD device 102, a Photon-Number-Splitting (PNS) attack on the signal state and the decoy state, based on analyzed drop in yield. The PNS attack is determined using a differential statistical analysis technique.

At block 414, the method 400A includes mapping, by the source QKD device 102, in response to the determined PNS attack, a decoded bit value with an encoded value for a plurality of sifted qubits associated with the decoy state received from the destination QKD device, to determine a number of detections in the plurality of sifted qubits.

At block 416, the method 400A includes performing, by the source QKD device 102, at least one of a termination and a continuation of generating a secret key, based on a baseline decoy Quantum Bit Error Rate (QBER) and a baseline signal Quantum Bit Error Rate (QBER) and a photon dependent yield of the signal pulses and decoy pulses.

The method 400A may be implemented in any suitable hardware, software, firmware, or combination thereof. The order in which the method 400A is described is not intended to be construed as a limitation, and any number of the described method blocks may be combined or otherwise performed in any order to implement the method 400A or an alternate method. Additionally, individual blocks may be deleted from the method 400A without departing from the spirit and scope of the present disclosure described herein. Furthermore, the method 400A may be implemented in any suitable hardware, software, firmware, or a combination thereof, that exists in the related art or that is later developed. The method 400A describes, without limitation, the implementation of the system 100. A person of skill in the art will understand that method 400A may be modified appropriately for implementation in various manners without departing from the scope and spirit of the disclosure.

Figure 4B:
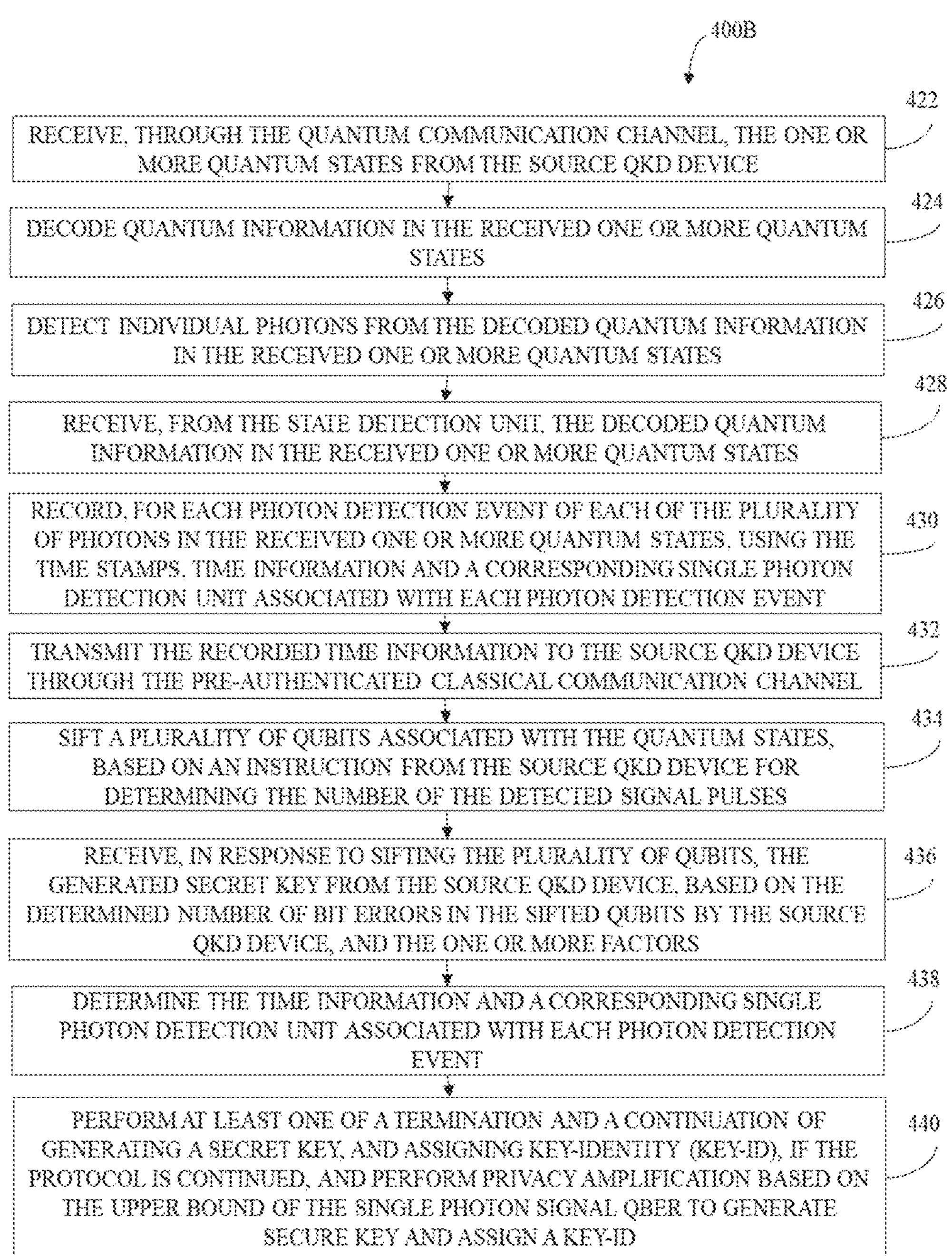
FIG. 4B is an exemplary flow diagram representation of a method for a point-to-point decoy Differential Phase Shift (DPS) Quantum Key Distribution (QKD) using a destination Quantum Key Distribution (QKD) device, through a secure quantum communication channel, in accordance with an embodiment of the present disclosure.

FIG. 4B is an exemplary flow diagram representation of a method 400B for a point-to-point decoy Differential Phase Shift (DPS) Quantum Key Distribution (QKD) using a destination Quantum Key Distribution (QKD) device 104, through a secure quantum communication channel, in accordance with an embodiment of the present disclosure.

At block 422, the method 400B includes receiving, by the destination QKD device 104 associated with the system 100, through the pre-authenticated classical communication channel, the one or more quantum states from the source QKD device 102.

At block 424, the method 400B includes recording, by the destination QKD device 104, for each photon detection event of each of the plurality of photons in the received one or more quantum states, time information and a corresponding detector unit associated with each photon detection event.

At block 426, the method 400B includes transmitting, by the destination QKD device 104, the recorded time information to the source QKD device 102 through the pre-authenticated classical communication channel.

At block 428, the method 400B includes sifting, by the source QKD device 102 and the destination QKD device 104, a plurality of qubits associated with the signal state and the decoy state, based on an instruction from the source QKD device 102 for determining the number of detections in the sifted qubits (i.e., parameter estimation phase).

At block 430, the method 400B includes receiving, by the destination QKD device 104, in response to sifting the plurality of qubits, the generated secret key from the source QKD device 102, based on the determined number of detections in the sifted qubits by the source QKD device 102, and the one or more factors.

The method 400B may be implemented in any suitable hardware, software, firmware, or combination thereof. The order in which the method 400B is described is not intended to be construed as a limitation, and any number of the described method blocks may be combined or otherwise performed in any order to implement the method 400B or an alternate method. Additionally, individual blocks may be deleted from the method 400B without departing from the spirit and scope of the present disclosure described herein. Furthermore, the method 400B may be implemented in any suitable hardware, software, firmware, or a combination thereof, that exists in the related art or that is later developed. The method 400B describes, without limitation, the implementation of the system 100. A person of skill in the art will understand that method 400B may be modified appropriately for implementation in various manners without departing from the scope and spirit of the disclosure.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for distributing quantum keys on a quantum device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

We claim:

1. A system for a point-to-point decoy Differential Phase Shift (DPS) Quantum Key Distribution (QKD), the system comprising:

a source Quantum Key Distribution (QKD) device comprising:

a state preparation unit configured to:

generate one or more quantum states comprising a series of N coherent pulses with one or more phases of the one or more quantum states, wherein the one or more quantum states comprises a signal state generated using a signal unit and a decoy state generated using a decoy unit;

attenuate, a transmission power of the signal state and the decoy state to control average number of photons for each of the series of N coherent pulses less than unity for a signal state and a decoy state, wherein the N coherent pulses corresponds to the highly attenuated pulses whose mean photon number (MPN) is less than unity;

a source post-processing unit comprising:

a source classical message transmitter unit configured to:

transmit, through a pre-authenticated classical communication channel, timing information of the generated one or more quantum states comprising the signal state and the decoy state, to a destination Quantum Key Distribution (QKD) device, wherein the attenuated N coherent pulses corresponds to Weak Coherent Pulses (WCP);

a source classical message receiver unit configured to:

receive, in response to the transmitted one or more quantum states, time information comprising a counting rate data of a plurality of photons in the one or more quantum states, from the destination QKD device through a pre-authenticated classical communication channel;

a source security analysis unit configured to:
analyze a drop in yield for the signal state and the decoy state due to one or more factors, based on the received time information comprising the counting rate data of the plurality of photons;
a source measure and monitor unit configured to:
determine a Photon-Number-Splitting (PNS) attack on point-to-point decoy-based Quantum Key Distribution (QKD) in the signal state and the decoy state, based on analyzed drop in yield, wherein the PNS attack is determined using a differential statistical analysis technique;
map, in response to the determined PNS attack, a decoded bit value with an encoded value for a plurality of sifted qubits associated with the decoy state received from the destination QKD device, based on time stamps, and randomly disclosing complete detected decoy values and one or more detected signal pulses, to determine a number of detections in the plurality of sifted qubits; and
a source key generation unit and a source key management unit configured to:
perform at least one of a termination and a continuation of generating a secret key, based on a baseline decoy Quantum Bit Error Rate (QBER) and a baseline signal Quantum Bit Error Rate (QBER) and a photon dependent yield of the signal pulses and decoy pulses, and performing privacy amplification based on the upper bound of the single photon signal QBER to generate secure key and assign a key-ID;
the destination QKD device comprising:
a state detection unit comprising:
a demodulation unit configured to:
receive, through the pre-authenticated classical communication channel, the one or more quantum states from the source QKD device;
decode quantum information in the received one or more quantum states;
a single photon detection unit configured to:
detect individual photons from the decoded quantum information in the received one or more quantum states;
a destination post-processing unit comprising:
a destination classical message receiver unit configured to:
receive, from the state detection unit, the decoded quantum information in the received one or more quantum states;
record, for each photon detection event of each of the plurality of photons in the received one or more quantum states, using the time stamps, time information and a corresponding single photon detection unit associated with each photon detection event;
a destination classical message transmitter unit configured to:
transmit the recorded time information to the source QKD device through the pre-authenticated classical communication channel;
a destination security analysis unit configured to:
sift a plurality of qubits associated with the one or more quantum states, based on an instruction from the source QKD device for determining the number of the detected signal pulses;
the destination classical message receiver unit configured to:
receive, in response to sifting the plurality of qubits, the generated secret key from the source QKD device, based on the determined number of detections in the sifted qubits by the source QKD device, and the one or more factors;
a destination measure and monitor unit configured to:
determine the time information and a corresponding single photon detection unit associated with each photon detection event; and
a destination key generation unit and a destination key management unit configured to:
perform at least one of a termination and a continuation of generating a secret key, and assigning key-identity (key-ID), if the secret key generation is continued, and performing privacy amplification based on the upper bound of the single photon signal QBER to generate secure key and assign a key-ID; and
a synchronization channel configured to exchange timing information of the source QKD device with the destination QKD device, and coordinate transmission and detection of the one or more quantum states, for synchronizing the clocks of the source QKD device with the destination QKD device to correlate the exchanged timing information.

2. The system as claimed in claim 1, wherein the source security analysis unit is further configured to determine the baseline decoy QBER and the baseline signal QBER and the photon dependent yield of the signal pulses and decoy pulses by:
calculating a signal gain of the signal state and a decoy gain of the decoy state from the plurality of sifted qubits and the series of N coherent pulses;
calculating a signal QBER of the signal state from the determined number of detections in a reconciled secret key and a number of sifted plurality of qubits associated with the signal state; and
calculating, a decoy QBER of the decoy state from the determined number of detections in the sifted qubits associated with the decoy state.

3. The system as claimed in claim 1, wherein the source security analysis unit is further configured to:
estimate a number of photons specific yields and a QBER associated with the signal state and the decoy state;
compare the estimated number of photons specific yields and the QBER between the signal state and the decoy state is within a predetermined tolerance value; and
perform continuation of generating the secret key, when the compared number of photons specific yields and the QBER between the signal state and the decoy state is within the predetermined tolerance value.

4. The system as claimed in claim 1, wherein the state detection unit is further configured to:
map each photon detection event to a corresponding pulse in the generated series of N coherent pulses; and
reconstruct the generated one or more quantum states, based on mapping each photon detection event to the corresponding pulse.

5. The system as claimed in claim 1, wherein the signal state carries a message, and the decoy state is used to detect eavesdropping.

6. The system as claimed in claim 1, wherein the one or more phases comprises an initial phase of each of the one or more quantum states, wherein the initial phase is at least one of a starting point or a reference point for the one or more phases of the N coherent pulses, and wherein the one or more phases comprises an encoded phase in which each of the series of N coherent pulses is encoded with a phase θn, wherein the phase θn comprises at least one of a '0' value and a 'π' value, wherein the at least one of a '0' value and a 'π' value of the phase θn is used to encode information to generate a shared secret key for a secure communication over the quantum communication channel.

7. The system as claimed in claim 1, wherein attenuating the transmission power comprises a plurality of levels of attenuation of the N coherent pulses.

8. The system as claimed in claim 1, wherein the transmission power is attenuated to establish average number of photons for each of the N coherent pulses is less than unity for the signal state and the decoy state.

9. The system as claimed in claim 1, wherein the one or more quantum states are generated using a chain of optical components comprising a laser, an inline polarizer, a True Random Number Generator (TRNG), an intensity modulator, a phase modulator, and Delay Line Interferometer (DLI), wherein the intensity modulator and a pulse modulator are used to randomly generate signal pulses of the signal state or decoy pulses of the decoy state, wherein the true random number generator is used to randomly select the signal pulses and the decoy pulses.

10. A method for a point-to-point decoy Differential Phase Shift (DPS) Quantum Key Distribution (QKD), the method comprising:

generating, by a source Quantum Key Distribution (QKD) device associated with a system, one or more quantum states comprising a series of N coherent pulses with one or more phases of the one or more quantum states, wherein the one or more quantum states comprises a signal state generated using a signal unit and a decoy state generated using a decoy unit;

attenuating, by the source QKD device, a transmission power of the signal state and the decoy state to control average number of photons for each of the series of N coherent pulses less than unity for a signal state and a decoy state, wherein the N coherent pulses corresponds to the highly attenuated pulses whose mean photon number (MPN) is less than unity;

transmitting, by the source QKD device, through a pre-authenticated classical communication channel, timing information of the generated one or more quantum states comprising the attenuated transmission power of the signal state and the decoy state, to a destination Quantum Key Distribution (QKD) device, wherein the attenuated N coherent pulses corresponds to Weak Coherent Pulses (WCP);

receiving, by the source QKD device, in response to the transmitted one or more quantum states, time information, from the destination QKD device through a pre-authenticated classical communication channel;

analyzing, by the source QKD device, a drop in yield for the signal state and the decoy state due to one or more factors, based on the received time information;

determining, by the source QKD device, a Photon-Number-Splitting (PNS) attack on point-to-point decoy-based Quantum Key Distribution (QKD) in the signal state and the decoy state, and randomly disclosing complete detected decoy values and one or more detected signal pulses, based on analyzed drop in yield, wherein the PNS attack is determined using a differential statistical analysis technique;

mapping, by the source QKD device, in response to the determined PNS attack, a decoded bit value with an encoded value for a plurality of sifted qubits associated with the decoy state received from the destination QKD device, based on time stamps, to determine a number of detections in the plurality of sifted qubits; and performing, by the source QKD device, at least one of a termination and a continuation of generating a secret key, based on a baseline decoy Quantum Bit Error Rate (QBER) and a baseline signal Quantum Bit Error Rate (QBER) and a photon dependent yield of the signal pulses and decoy pulses, and performing privacy amplification based on the upper bound of the single photon signal QBER to generate secure key and assign a key-ID.

11. The method as claimed in claim 10 further comprising:

receiving, by the destination QKD device associated with the system, through the pre-authenticated classical communication channel, the one or more quantum states from the source QKD device;

decoding, by the destination QKD device, quantum information in the received one or more quantum states;

detecting, by the destination QKD device, individual photons from the decoded quantum information in the received one or more quantum states;

receiving, by the destination QKD device, from the state detection unit, the decoded quantum information in the received one or more quantum states;

recording, by the destination QKD device, for each photon detection event of each of the plurality of photons in the received one or more quantum states, using the time stamps, time information and a corresponding single photon detection unit associated with each photon detection event;

transmitting, by the destination QKD device, the recorded time information to the source QKD device through the pre-authenticated classical communication channel;

sifting, by the destination QKD device, a plurality of qubits associated with the one or more quantum states, based on an instruction from the source QKD device for determining the number of the detected signal pulses;

receiving, by the destination QKD device, in response to sifting the plurality of qubits, the generated secret key from the source QKD device, based on the determined number of detections in the sifted qubits by the source QKD device, and the one or more factors;

Determining, by the destination QKD device, the time information and a corresponding single photon detection unit associated with each photon detection event; and performing, by the destination QKD device, at least one of a termination and a continuation of generating a secret key, and assigning key-identity (key-ID), if the protocol is continued, and performing privacy amplification based on the upper bound of the single photon signal QBER to generate secure key and assign a key-id, wherein the source QKD device and the destination QKD device, exchanges timing information, coordinate transmission and detection of the one or more quantum states through a synchronization channel, for synchronizing the clocks of the source QKD device with the destination QKD device to correlate the exchanged timing information.

12. The method as claimed in claim 10, wherein the method further comprises determining, by the source QKD device, the baseline decoy QBER and the baseline signal QBER and the photon dependent yield of the signal pulses and decoy pulses by:

calculating a signal gain of the signal state and a decoy gain of the decoy state from the plurality of sifted qubits and the series of N coherent pulses;

calculating a signal QBER of the signal state from the determined number of detections in a reconciled secret key and a number of sifted plurality of qubits associated with the signal state; and calculating, a decoy QBER of the decoy state from the determined number of detections in the sifted qubits associated with the decoy state.

13. The method as claimed in claim 10 further comprising:

estimating, by the source QKD device, a number of photons specific yields and a QBER associated with the signal state and the decoy state;

comparing by the source QKD device, the estimated number of photons specific yields and the QBER between the signal state and the decoy state is within a predetermined tolerance value; and performing, by the source QKD device, continuation of generating the secret key, when the compared number of photons specific yields and the QBER between the signal state and the decoy state is within the predetermined tolerance value.

14. The method as claimed in claim 11 further comprising:

mapping, by the destination QKD device, each photon detection event to a corresponding pulse in the generated series of N coherent pulses; and reconstructing, by the destination QKD device, the generated one or more quantum states, based on mapping each photon detection event to the corresponding pulse.

15. The method as claimed in claim 10, wherein the signal state carries a message, and the decoy state is used to detect eavesdropping.

16. The method as claimed in claim 10, wherein the one or more phases comprises an initial phase of each of the one or more quantum states, wherein the initial phase is at least one of a starting point or a reference point for the one or more phases of the N coherent pulses, and wherein the one or more phases comprises an encoded phase in which each of the series of N coherent pulses is encoded with a phase $\theta n$, wherein the phase $\theta n$ comprises at least one of a '0' value and a 'π' value, wherein the at least one of a '0' value and a 'π' value of the phase $\theta n$ is used to encode information to generate a shared secret key for a secure communication over the quantum communication channel.

17. The method as claimed in claim 10, wherein attenuating the transmission power comprises a plurality of levels of attenuation of the N coherent pulses.

18. The method as claimed in claim 10, wherein the transmission power is attenuated to establish average number of photons for each of the N coherent pulses less than unity for the signal state and the decoy state.

* * * * *